(12) United States Patent
Allouche et al.

(10) Patent No.: US 11,995,068 B1
(45) Date of Patent: May 28, 2024

(54) ANOMALY DETECTION OF ENTITY BEHAVIOR

(71) Applicant: International Business Machines Corporation, Armonk, NY (US)

(72) Inventors: Yair Allouche, Dvira (IL); Aviad Cohen, Meitar (IL); Eitan Daniel Farchi, Pardes Hana (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/142,584

(22) Filed: May 3, 2023

(51) Int. Cl.
| | |
|---|---|
| G06F 16/00 | (2019.01) |
| G06F 16/22 | (2019.01) |
| G06F 16/23 | (2019.01) |
| G06F 18/2413 | (2023.01) |
| G06N 20/00 | (2019.01) |

(52) U.S. Cl.
CPC ...... *G06F 16/2365* (2019.01); *G06F 16/2237* (2019.01); *G06F 18/24143* (2023.01); *G06N 20/00* (2019.01)

(58) Field of Classification Search
CPC .................................................. G06F 16/2237
See application file for complete search history.

(56) References Cited

U.S. PATENT DOCUMENTS

| | | | |
|---|---|---|---|
| 2021/0067549 A1* | 3/2021 | Chen | G06N 3/084 |
| 2021/0152581 A1 | 5/2021 | Hen | |

FOREIGN PATENT DOCUMENTS

| | | |
|---|---|---|
| WO | 2019043163 A1 | 3/2019 |

OTHER PUBLICATIONS

"Feature extraction"; Online at: https://scikit-learn.org/stable/modules/feature_extraction.html (unknown publication date).

Alexander Bakumenko et al, "Detecting Anomalies in Financial Data Using Machine Learning Algorithms"; Systems 10, No. 5: 130, Aug. 25, 2022.

Anitha Ramchandran et al, "Unsupervised Anomaly Detection for High Dimensional Data—An Exploratory Analysis"; Computational Intelligence for Multimedia Big Data on the Cloud with Engineering Applications, Intelligent Data-Centric Systems, pp. 233-251, Aug. 24, 2018.

(Continued)

*Primary Examiner* — Ajith Jacob
(74) *Attorney, Agent, or Firm* — Eyal Gilboa; Samuel A. Waldbaum

(57) ABSTRACT

A method including: receiving a set of data representing usage by entities of objects in a computing resource; extracting, from the initial set of data, one or more feature vectors representing the usage by one of the entities with respect to the objects; generating, from the feature vectors, a feature matrix; with respect to each entry in the feature matrix: (i) assigning a binary value to the entry, based on a predefined usage threshold, (ii) identifying, among the one or more entities, k nearest neighbor entities with respect to the one of the entities, based on a predefined distance threshold, and (iii) modifying the usage value of the entry, based on usage values associated with each of the k nearest neighbor entities with respect to the one of the objects; and updating the feature matrix with the modified usage values, to obtain a manipulated feature matrix.

20 Claims, 9 Drawing Sheets

(56) References Cited

OTHER PUBLICATIONS

Aviad Cohen et al, "SFEM: Structural feature extraction methodology for the detection of malicious office documents using machine learning methods"; Expert Systems With Applications, vol. 63, pp. 324-343, Nov. 30, 2016.

K.T.Divya et al, "Improved Outlier Detection Using Classic KNN Algorithm"; International Research Journal of Engineering and Technology (IRJET), vol. 03 Issue: 12, pp. 892-898, Dec. 2016.

Michael E. Houle, "Dimensionality, Discriminability, Density & Distance Distributions"; IEEE 13th International Conference on Data Mining Workshops; pp. 468-473, Dec. 7-10, 2013.

Nedim Srndic et al, "Detection of Malicious PDF Files Based on Hierarchical Document Structure"; Online at: https://www.ndss-symposium.org/wp-content/uploads/2017/09/12_3_0.pdf, 2013.

Srikanth Thudumu et al, "A comprehensive survey of anomaly detection techniques for high dimensional big data"; Journal of Big Data, vol. 7, Article No. 42, Jul. 2, 2020.

T. Abou-Assaleh et al, "N-gram-based Detection of New Malicious Code"; Proceedings of the 28th Annual International Computer Software and Applications Conference, COMPSAC 2004; vol. 2, pp. 41-42, Sep. 28-30, 2004.

Wanghu Chen et al, "Anomaly detection of high-dimensional sparse data based on Ensemble Generative Adversarial Networks"; 2021 IEEE International Conference on Big Data (Big Data), Dec. 15-18, 2021.

Zheng J. et al, "Anomaly detection for high-dimensional space using deep hypersphere fused with probability approach"; Complex Intell. Syst. vol. 8, pp. 4205-4220, Mar. 24, 2022.

\* cited by examiner

ANOMALY DETECTION OF ENTITY BEHAVIOR

BACKGROUND

The present application relates to the field of computer system security.

One of the main challenges in machine learning when dealing with high-dimensional datasets is the effect known as the "curse of dimensionality," which refers to various challenges associated with analyzing and organizing data in high-dimensional spaces. The most common challenge is that higher dimensionality also increases the volume of the space, such that the available data become sparse. This requires an exponential increase in the amount of data in order to obtain a reliable result.

Generally, the number of dimensions in a dataset is determined during the process of feature extraction from raw data. Feature extraction techniques can be divided into two basic categories. "Fixed" feature extraction obtains identical features from each data element. For example, a "fixed" feature extractor applied to text files will be configured to extract the same features from each file—for example, file size, number of lines, etc. "Variable" feature extraction may extract different features from each data element. For example, a "variable" feature extractor configured to extract words from text files, may extract different word sets from different files. The best known variable feature extractor is the N-gram feature extractor which extracts, from a given file, byte/character sequences of length N, using a sliding window with stride S. There are more examples, such as structural feature extraction methodology (SFEM), which extract variable features from Microsoft Office documents or PDF documents.

Because "variable" feature extractors usually extract different features from different data elements, the space of all possible unique features may be vast. Thus, a feature selection stage is usually performed, to select a subset of the most relevant features for use in model construction. This step allows for simpler and more efficient models and for shorter training times, which also avoids the curse of dimensionality.

Although common dimensionality reduction techniques are generally very useful for generating compact representations or classification purposes, the reduced representations are not guaranteed to retain sufficient information to detect isolated anomalies in the dataset. Specifically, the contributions of isolated uncorrelated features may be insignificant for explaining variance in the dataset, and thus such features may not be included in the reduced data representation. However, these isolated features may reflect anomalies, which ultimately would not be represented in the reduced data space.

Thus, when training machine learning models for unsupervised anomaly detection, it may be necessary to use the entire feature set when constructing the training dataset, because any one of the features may represent a relevant anomaly. This often significantly increases the volume of the training dataset, and results in a sparse training dataset. Distance-based anomaly detection models trained on such high-dimensionality, sparse datasets will simply not be sensitive enough to detect low-incidence behavior.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a computer-implemented method comprising: receiving a set of data representing usage by entities of objects in a computing resource; extracting, from the received initial set of data, one or more feature vectors, each representing the usage by a particular one of the entities with respect to the objects; generating, from the one or more feature vectors, a feature matrix; with respect to each entry in the feature matrix, wherein the entry comprises a usage value associated with one of the entities and one of the objects: (i) assigning a binary value to the entry, based on a predefined usage threshold, (ii) identifying, among the one or more entities, k nearest neighbor entities with respect to the one of the entities, based on a predefined distance threshold, and (iii) modifying the usage value of the entry, based on usage values associated with each of the k nearest neighbor entities with respect to the one of the objects; and updating the feature matrix with the modified usage values, to obtain a manipulated feature matrix.

There is also provided, in an embodiment, a system comprising at least one hardware processor; and a non-transitory computer-readable storage medium having stored thereon program instructions, the program instructions executable by the at least one hardware processor to: receive a set of data representing usage by entities of objects in a computing resource, extract, from the received initial set of data, one or more feature vectors, each representing the usage by a particular one of the entities with respect to the objects, generate, from the one or more feature vectors, a feature matrix, with respect to each entry in the feature matrix, wherein the entry comprises a usage value associated with one of the entities and one of the objects: (i) assign a binary value to the entry, based on a predefined usage threshold, (ii) identify, among the one or more entities, k nearest neighbor entities with respect to the one of the entities, based on a predefined distance threshold, and (iii) modify the usage value of the entry, based on usage values associated with each of the k nearest neighbor entities with respect to the one of the objects, and update the feature matrix with the modified usage values, to obtain a manipulated feature matrix.

There is further provided, in an embodiment, a computer program product comprising a non-transitory computer-readable storage medium having program instructions embodied therewith, the program instructions executable by at least one hardware processor to: receive a set of data representing usage by entities of objects in a computing resource; extract, from the received initial set of data, one or more feature vectors, each representing the usage by a particular one of the entities with respect to the objects; generate, from the one or more feature vectors, a feature matrix; with respect to each entry in the feature matrix, wherein the entry comprises a usage value associated with one of the entities and one of the objects: (i) assign a binary value to the entry, based on a predefined usage threshold, (ii) identify, among the one or more entities, k nearest neighbor entities with respect to the one of the entities, based on a predefined distance threshold, and (iii) modify the usage value of the entry, based on usage values associated with each of the k nearest neighbor entities with respect to the one of the objects; and update the feature matrix with the modified usage values, to obtain a manipulated feature matrix.

In some embodiments, the program instructions are further executable to manipulate, and the method further comprises manipulating, the one or more feature vectors based on the manipulated feature matrix, to obtain one or more manipulated feature vectors.

In some embodiments, the program instructions are further executable to construct, and the method further comprises constructing, a training dataset from all of the manipulated feature vectors, wherein the constructed training dataset is used to train an anomaly detection machine learning model.

In some embodiments, the program instructions are further executable to inference, and the method further comprises inferencing, the trained anomaly detection machine learning model over a target manipulated feature vector representing usage by any one of the entities with respect to the computer resource, to detect anomalous behavior by the one of the entities.

In some embodiments, the manipulating comprises, with respect to each feature in a feature vector that has a value equal to zero, modifying the feature based on (i) a predefined maximum distance parameter, multiplied by (ii) a number of the k nearest neighbor entities for which a corresponding value is equal to 1.

In some embodiments, the modifying is further based on a distance between the one of the entities and each of the k nearest neighbors entities.

In some embodiments, the modifying is further based on a similarity score associated with each of the k nearest neighbor entities, wherein the similarity score is based on: the number k, the usage value associated with each of the k nearest neighbors, the distance between the one of the entities and each of the k nearest neighbors, and a predefined similarity factor.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a technique, embodied in a computer-implemented method, a system, and a computer program product, for an automated feature manipulation configured to optimize the generation of feature spaces used for training and inferencing anomaly-detection machine learning models.

In some embodiments, the present technique is particularly useful for generating feature representation of data, for use in constructing training datasets that are used for unsupervised training of anomaly-detection machine learning models. According to an exemplary use case, the present technique may be used to generate an optimized feature space for use in training and inferencing anomaly-detection machine learning models. In some embodiments, the present technique may be used to train and inference any known machine learning models for anomaly detection.

In some embodiments, the present technique is configured to receive, as input, a feature vector extracted from raw data. In some embodiments, the received feature vector is generated by conducting a feature extraction process over an initial set of data. For example, an exemplary set of data may represent usage and behavior by entities (e.g., users) in conjunction with a database resource within an enterprise. The received feature vector is an n-dimensional vector of numerical features that represent the usage and behavior of one or more entities over the database resource within the enterprise. The usage and behavior patterns may reflect, e.g., the different objects of the database resource accessed and used by each entity over time.

In some embodiments, the received feature vector represents a high-dimensional feature space. As noted above, in the case of common distance-based anomaly-detection models, dimensionality reduction techniques can result in the loss of relevant anomaly information in the reduced data space. Thus, when training machine learning models for unsupervised anomaly detection, it may be necessary to use the entire feature set when constructing the training dataset, because any one of the features may represent a relevant anomaly. However, this may significantly increase the volume of the training dataset, and result in a sparse training dataset. Consequently, an anomaly-detection trained on such resulting high-dimensional sparse training dataset may exhibit sub-optimal detection performance, particularly with respect to isolated or low-incidence instances.

Accordingly, in some embodiments, the present technique provides for an automated feature manipulation technique configured to optimize the generation of feature spaces for unsupervised training of anomaly-detection machine learning models. A machine learning model trained on an optimized feature space generated according to the present technique will exhibit increased sensitivity to changes in zero-variance features in the training set, and thus better detection performance.

Figure 1:
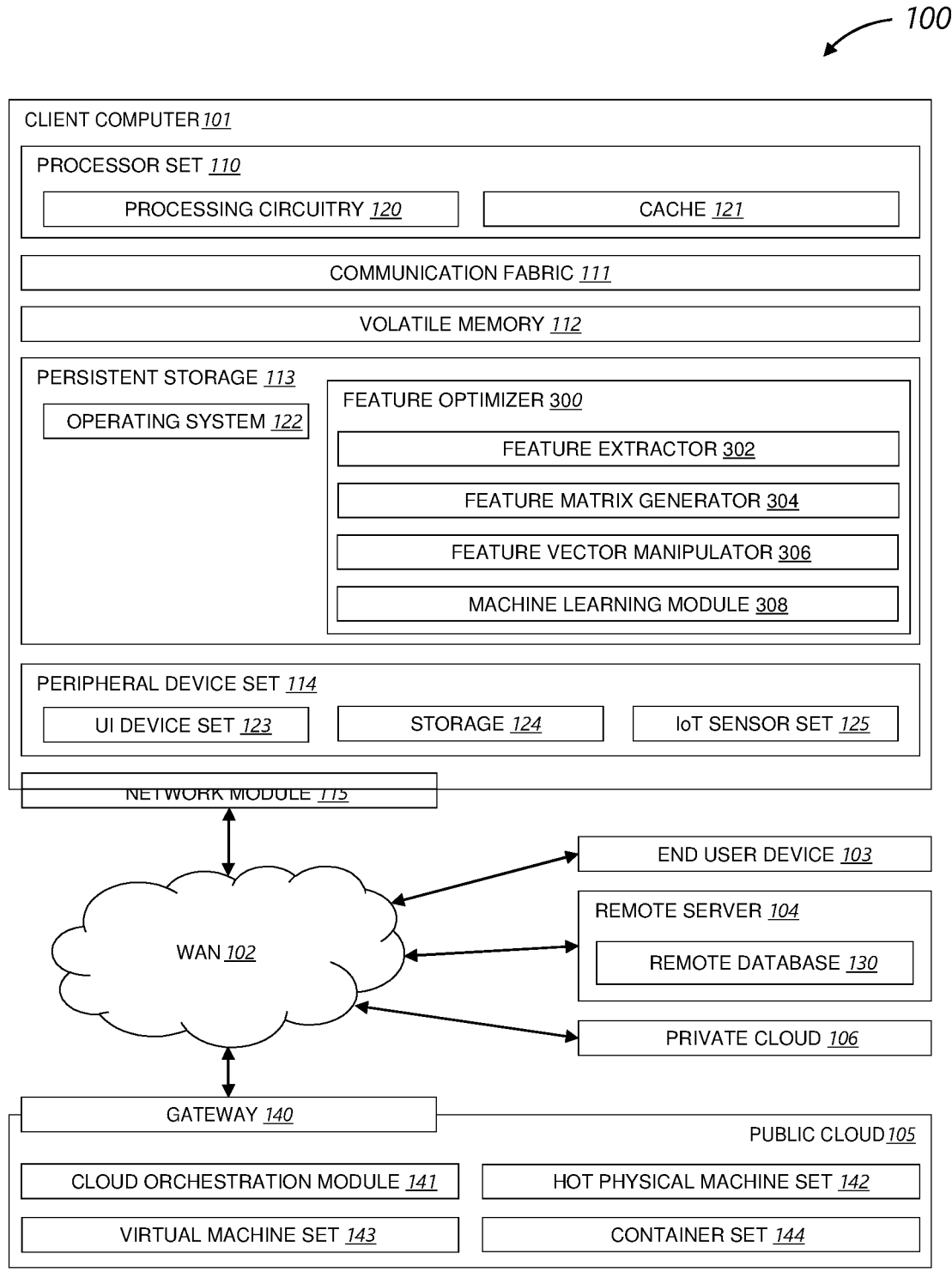
FIG. 1 is a block diagram of an exemplary computing environment for the execution of at least some of the computer code involved in performing the inventive methods.

Reference is now made to FIG. 1, which depicts a block diagram of an exemplary computing environment 100, containing an example of an environment for the execution of at least some of the computer code involved in performing the inventive methods, such as feature optimizer 300, comprising one or more modules, such as feature extractor 302, feature matrix generator 304, feature vector manipulator 306, and/or anomaly-detection model 308. In addition to feature optimizer 300, computing environment 100 includes, for example, a computer 101, a wide area network (WAN) 102, an end user device (EUD) 103, a remote server 104, a public cloud 105, and/or a private cloud 106. In this example, computer 101 includes a processor set 110 (including processing circuitry 120 and a cache 121), a communication fabric 111, a volatile memory 112, a persistent storage 113 (including an operating system 122 and feature optimizer 300, as identified above), a peripheral device set 114 (including a user interface (UI), a device set 123, a storage 124, and an Internet of Things (IoT) sensor set 125), and a network module 115. Remote server 104 includes a remote database 130. Public cloud 105 includes a gateway 140, a cloud orchestration module 141, a host physical machine set 142, a virtual machine set 143, and a container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the method(s) specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored by feature optimizer 300 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in feature optimizer 300 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as a network interrace controller (NIC), a modem, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through the hardware included in network module 115.

WAN 102 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As will be seen, the techniques described herein may operate in conjunction within the environment illustrated in FIG. 1, in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system comprising hardware and software, and these entities communicate with one another over a network, such as the Internet, an intranet, an extranet, a private network, or any other communications medium or link. A data processing system typically includes one or more processors, an operating system, one or more applications, and one or more utilities.

The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 2:
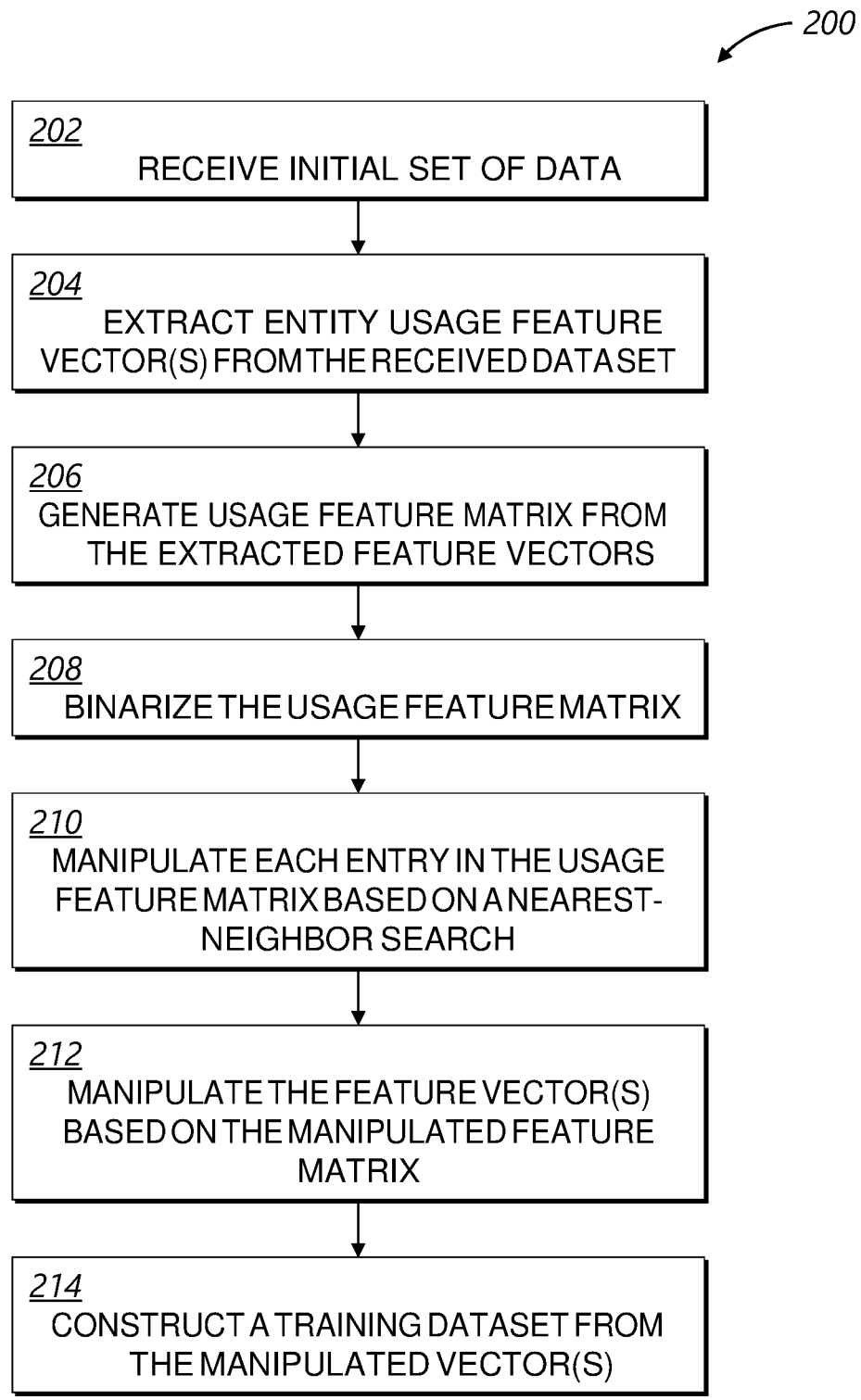
FIG. 2 is a flowchart of a method for automated feature manipulation configured to optimize the generation of features used for training Anomaly-detection machine learning models, in accordance with an embodiment of the present technique.
Figure 3:
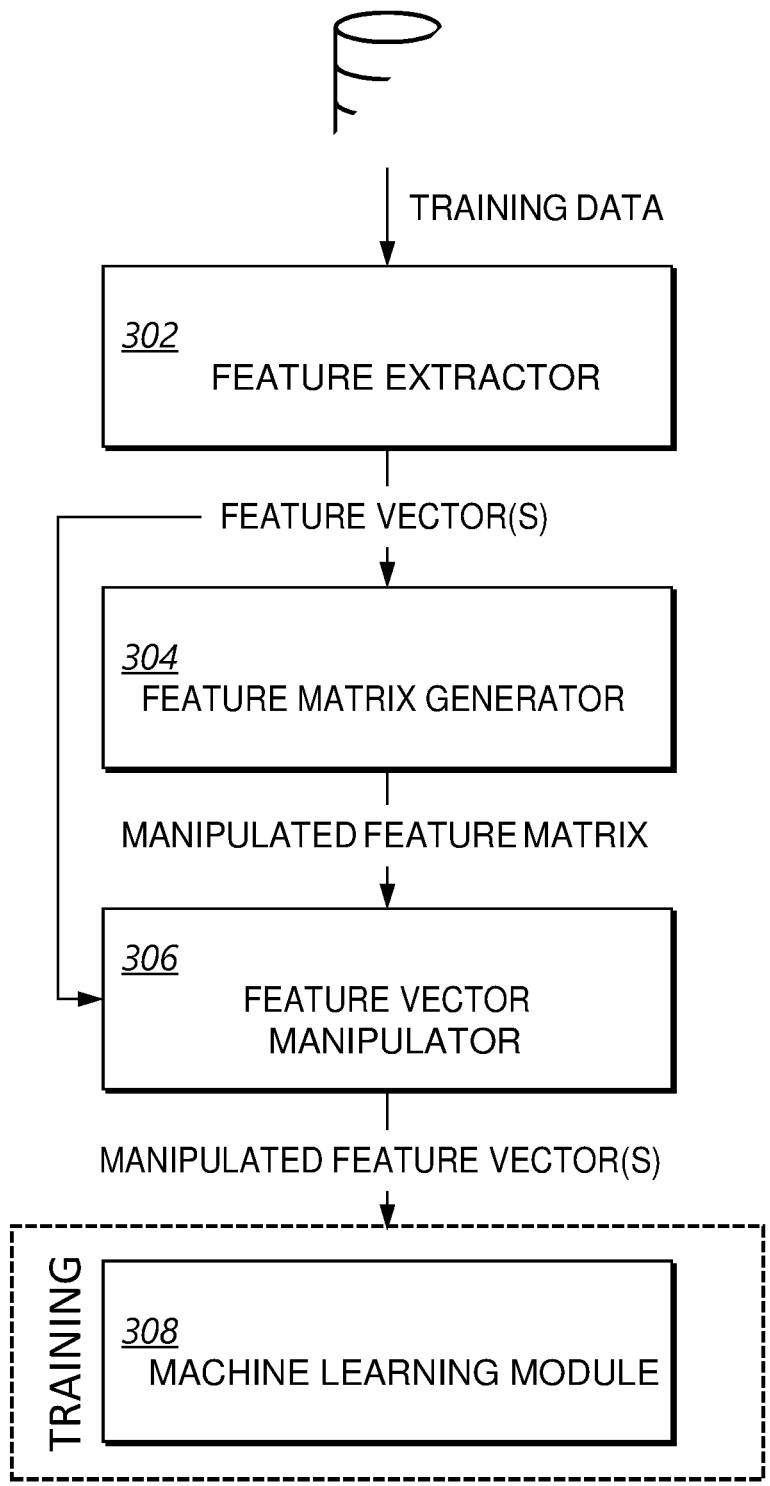
FIG. 3 depicts an exemplary pipeline for training an anomaly-detection machine learning model using an optimized feature space generated by the present technique, in accordance with an embodiment of the present technique.

The instructions of feature optimizer 300 are now discussed with reference to the flowchart of FIG. 2, which illustrates a method 200 representing an automated feature manipulation technique configured to optimize the generation of features used for training anomaly-detection machine learning models, in accordance with an embodiment of the present technique. FIG. 3 depicts an exemplary pipeline for training an anomaly-detection machine learning model using an optimized feature space generated by the present technique, as may be realized by feature optimizer 300 shown in FIG. 1.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by computer 101 of FIG. 1, and/or by any other applicable component of computing environment 100), unless specifically stated otherwise.

Method 200 begins in step 202, wherein feature optimizer 300 receives an initial set of data. In an exemplary embodiment of method 200, the initial set of data represents usage and behavior over time by entities (e.g., users) over a database resource within an enterprise. For example, such data may comprise information regarding usage and access by each entity of different database objects (i.e., any defined object in a database that is used to store or reference data, such as tables, views, sequences, and the like).

In step 204, the instructions of feature extractor 302 may cause feature optimizer 300 to perform a feature extraction stage with respect to the initial set of data received in step 202. In some embodiments, the feature extraction stage comprises transforming the raw data into a numerical representation that can be directly processed by a computing system, such as computer 101 in FIG. 1, while preserving the information represented in the original data set.

Accordingly, in some embodiments, feature extractor 302 may generate, with respect to each identified entity e in the received raw data, one or more feature vectors V. Each of the feature vectors V is an n-dimensional vector of numerical features that represents the usage by entity e of database resource objects during a specified period of time. In some embodiments, the generated one or more feature vectors V may be sent for further processing to one or more other modules of feature optimizer 300, such as feature matrix generator 304 and/or feature vector manipulator 306.

In step 206, the instruction of feature matrix generator 304 may cause feature optimizer 300 to generate a feature matrix U based on the received one or more feature vectors V generated in step 204. In the exemplary case of entity usage over a database resource within an enterprise, the feature vectors V generated in step 204 represent the usage by each entity within an enterprise, of the various database objects over time. Thus, for each entity e, matrix U comprises an entity-object usage vector V(e).

In turn, each matrix entry (e, o) in feature matrix U represents a value associated with the aggregate usage by a particular entity e of a particular database object o. The value represented by each entry (e, o) in feature matrix U may reflect a function applied to the raw data, such as sum, average, etc.

At the conclusion of step 206, feature matrix generator 304 obtains a feature matrix U representing the aggregate usage by each entity within an enterprise of the various database objects over time.

In step 208, the instructions of feature matrix generator 304 may cause feature optimizer 300 to binarize feature matrix U, by assigning a binary value (e.g., 0,1) such that a feature matrix entry (e, o) is equal to 1 if entity e uses object o above a predefined threshold t, else entry (e, o) equals 0. The binarizing process is denoted in Equation (1) below:

$$U(e, o) = \begin{cases} 1 & \text{if } U(e, o) > t \\ 0 & \text{else} \end{cases} \quad (1)$$

In step 210, the instructions of feature matrix generator 304 may cause feature optimizer 300 to generate a manipulated U' version of binarized feature matrix U generated in step 208, by adjusting each entry (e, o) based on a nearest-neighbor search with respect to entity e. In some embodiments, the nearest neighbor search may be conducted using any suitable algorithm, such as K-Nearest Neighbors (KNN). Specifically, for each entity e in feature matrix U, feature matrix generator 304 conducts a nearest-neighbor search to identify its k nearest neighbors, based on usage threshold with respect to a database object o, and a distance threshold. Feature matrix generator 304 may then adjust the binary value previously assigned to an entry (e, o), based the number of nearest neighbors identified in the search, the usage values of feature o associated with the identified nearest neighbors, the relative distances of the nearest neighbors from entity e, and a neighbor similarity factor NSF, which is a predefined parameter.

Accordingly, in some embodiments, feature matrix generator 304 applies the following function to entry (e, o), which returns a value between 0 and 1:

$$U'(e,o)=\min(1,U(e,o)+o(d_{e,k}u_{e,k})), \quad (2)$$

where:
- $u_{e,k}$ represents the usage values with respect to object o of the k nearest neighbors of entity e,
- $d_{e,k}$ represents the distances of the of the k nearest neighbors from entity e.

Equation (3) is an exemplary matrix manipulation function which may be applied by feature matrix generator 304 to each matrix entry (e, o) in matrix U, to obtain matrix U':

$$U'^{(e,o)} = \min\left(1, U(e, o) + \frac{NSF}{|N(i)|} \cdot \sum_{k \in N(i)} U(e, k) \cdot e^{-\beta \cdot d(e,k)}\right), \quad (3)$$

where NSF is a predefined numeric value representing a neighbor similarity factor.

Feature matrix generator 304 may then update feature matrix U with the manipulated entry values determined by Equation (3), to obtain manipulated feature matrix U'.

In step 212, the instructions of feature vector manipulator 306 may cause feature optimizer 300 to manipulate each of the one or more feature vectors generated in step 204, based on the manipulated feature matrix U' generated in step 210.

Accordingly, in some embodiments, feature vector manipulator 306 receives, as input, one or more feature vectors V of entity e with respect to a database object o, and the manipulated feature matrix U'. Feature vector manipulator 306 then generates a manipulated feature vector V'. First, feature vector manipulator 306 binarizes vector V using the predefined usage threshold t, as detailed with respect to step 208 of method 200. Then, for any vector entry V(o) which has a value of zero (i.e., representing zero usage by entity e of the database object o), the value of the corresponding feature V'(o) in manipulated feature vector V' is adjusted according to Equation (4):

$$V'(o) = \begin{cases} V(o) & \text{if } V(o) = 1 \\ (U'(e, o) - 1) * \text{Max\_Distance} & \text{if } V(o) = 0 \end{cases} \quad (4)$$

The rationale behind this manipulation applies in cases where entity e did not use a particular database object at all, or used it below the predefined threshold t (i.e., the corresponding feature matrix entry (e, o) in manipulated feature matrix U' is equal to zero). In such cases, the value of the corresponding feature V(o) is adjusted to Max_Distance, a parameter which increases the distance value of the feature in question to a maximal predefined value, such as 10,000. In some cases, Max_distance is further modified by multiplying it by U'(e, o), which represents the usage by the k nearest neighbors of entity e of object o.

For example, consider a case in which a particular entity e did not use a database object o, or used it only very rarely. This information is reflected in the raw initial set of data (received in step 202), and will lead to the feature vector entry V(o) being set to zero. This data may then be used to train an anomaly detection model.

During inferencing of the trained anomaly detection model, the target usage data for entity e may reflect post-training usage by entity e of object o (which, as noted, above, is not reflected in the original training dataset). The adjustment of V'(o) by Max_Distance helps to increase the distance between the training data vector V'(o) and the corresponding inference target vector, thereby improving anomaly detection of such occurrences.

At the conclusion of step 212, feature vector manipulator 306 obtains manipulated one or more feature vectors V', based on the input feature vectors V obtained in step 204, and the manipulated feature matrix U' obtained in step 210.

In step 214, machine learning module 308 may construct a training dataset comprising at least some of the manipulated feature vectors V' created in step 212, for unsupervised training of an anomaly detection machine learning model. As shown in FIG. 3, a training dataset comprising at least some of the manipulated feature vectors V' may be used to train an anomaly detection machine learning model, as may be realized by machine learning module 308 of feature optimizer 300.

The exemplary Algorithm 1 described below represents pseudo-code configured to generate a manipulated feature matrix U' from raw tabular usage data, as detailed with reference to steps 202-210 of method 200.

Inputs for Algorithm 1 include the following data, parameters, and functions:
  Raw_Tabular_Data: Tabular data representing usage over time within an enterprise by each entity e of each database object o.
  Group_By_Function: Function which totals usage instances by entity e of object o within Raw-tabular-Data, to generate the feature matrix, as detailed in step 206 of method 200.
  Usage_Threshold: A usage value threshold used to assign a binary value to the usage totals generated by Group_By_Function.
  K: The target number of neighbors to search using a nearest-neighbor algorithm, as detailed in step 210 of method 200.
  Distance_Function: A value representing the distance between an entity e and its nearest neighbors identified in the nearest neighbor search.
  Neighbor_Distance_Threshold: A distance below which a point is considered as a neighbor with respect to entity e.
  Neighbor_Similarity_Factor (NSF): A predefined factor used in neighbor similarity score calculations.
  Neighbor_Similarity_Score (NSS): A function that calculates a similarity score for a neighbor of entity e, based on:
    K: the target number of neighbors.
    Neighbor_Usage: The usage by the neighbor of database objects.
    Neighbor_Distance: The distance of the neighbor from the entity e.
    NSF.

Functions used by Algorithm 1 to generate and binarize the feature matrix, as described with reference to steps 206-208 in method 200:
Generating a Feature_Matrix from Raw Data
  Input: Raw_Tabular_Data, Entity_ID_Object,
  Output: Feature_Matrix
  1:    Function  Generate_Feature_Matrix(Raw_Tabular_Data, Entity_ID_Object, Group_By_Function)
Binarizing the Feature_Matrix
  Input: Feature_Matrix
  Output: Binarized Feature_Matrix
  1: Function Binarize_Matrix(Feature_Matrix, Threshold):
  2: For Feature_Vector in Feature_Matrix:
  3:     Feature_Vector=Binarize_Vector(Feature_Vector, Threshold)
  4: return Feature_Matrix
Binarizing Feature Vectors in the Feature_Matrix

---

Input:  Feature_Vector, Threshold
Output: Binarized Feature_Vector
1: Function Binarize_Vector(Feature_Vector, Threshold):
2:   For feature in Feature_Vector:
3:     if feature[Feature_Vector] > Threshold:
4:       feature[Feature_Vector] = 1
5:     else
6:       feature[Feature_Vector] = 0
7:   return Feature_Vector

---

Algorithm 1: Generating the Binarized Manipulated Feature_Matrix

---

Input:  Binarized Feature_Matrix U.
Output: Manipulated feature matrix U'.
1: For each entity e in U'
2:   find k nearest neighbors using Distance_Funcion in U
3:   For each entry (e, o) in U:
4:     If U'(e, o) = 0 then
5:       For each neighbor n in k
6:         If U(n, o) == 1 then
7:           U'(e, o)+=
             NSS (K, Neighbor_Usage, Neighbor_Distance, NSF)
8: Return U'

---

The following exemplary Algorithm 2 may be used to generate a manipulated feature vector V', from an input feature vector V (as generated with reference to step 204 in method 200), and the manipulated feature matrix U' (as generated with reference to step 210 in method 200).
Algorithm 2:

```
Input:   Feature vector V(e), manipulated feature matrix U'
Output:  Manipulated feature vector V'(e)
1: V(e) = Binarize_Vector(V(e), Usage_Threshold).
2:   For each feature V(e, o) in input feature vector V(e)
3:     if V(e, o) == 0 then
4:       V(e, o) = (U'(e, o) – 1)*Max_Distance
5: return V'(e)
```

Exemplary Algorithm 2 adjusts the value of vector features representing zero usage by an entity e of an object o, to Max_Distance, a parameter which increases the distance value of the feature in question to a maximal predefined value, such as 10,000. In some cases, Max_distance is modified by U'(e, o) which represents the usage by the k nearest neighbors of entity e of object o.

Table 1 below provides examples of the way feature manipulation impacts that value of a feature V, (e, o) representing the usage by entity e of an object o, in a training data and in inferencing target data. The value of Max_Distance is set to 10,000.

TABLE 1

| Training Use Instances | Inference Use Instances | k Neighbors Use Instances | Training Data Feature Value | Inference Data Feature Value | Distance |
|---|---|---|---|---|---|
| 0 | 0 | 0 | 10,000 | 10,000 | 0 |
| 0 | 100 | 0 | 10,000 | 100 | 10,000 – 100 |
| 0 | 100 | 2 | (⅔)*10,000 | 100 | (⅔)*10,000 – 100 |
| 100 | 80 | — | 100 | 80 | 100 – 80 |
| 100 | 0 | 3 | 100 | 10,000*(⅗) | 100 – 10,000*(⅗) |

Figure 4:
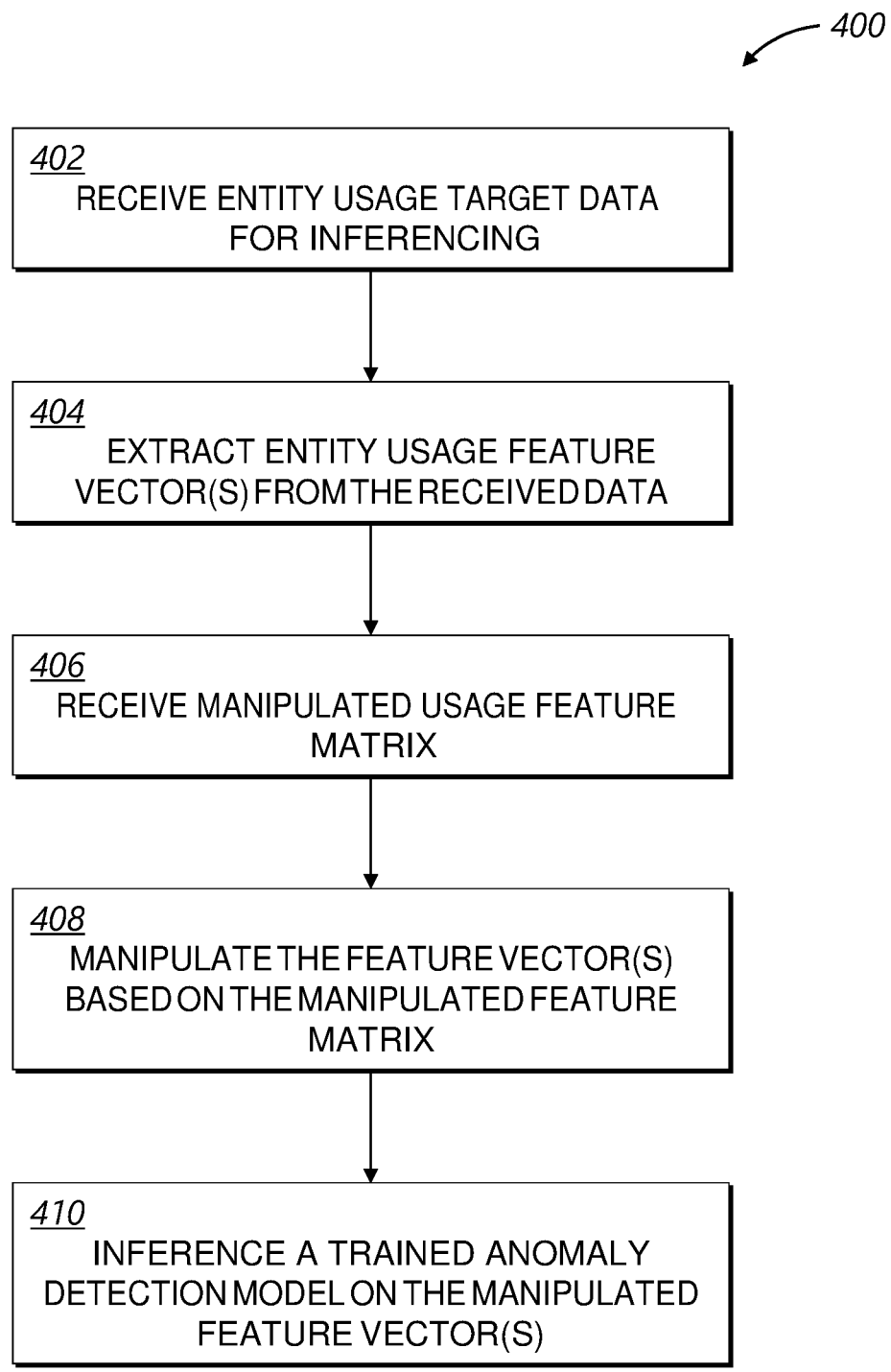
FIG. 4 is a flowchart of a method for automated feature manipulation configured to optimize the generation of features used for inferencing anomaly-detection machine learning models, in accordance with an embodiment of the present technique.

The instructions of feature optimizer 300 are now further discussed with reference to the flowchart of FIG. 4, which illustrates a method 400 representing an automated feature manipulation technique configured to optimize the generation of features used for inferencing anomaly-detection machine learning models, in accordance with an embodiment of the present technique.

Figure 5:
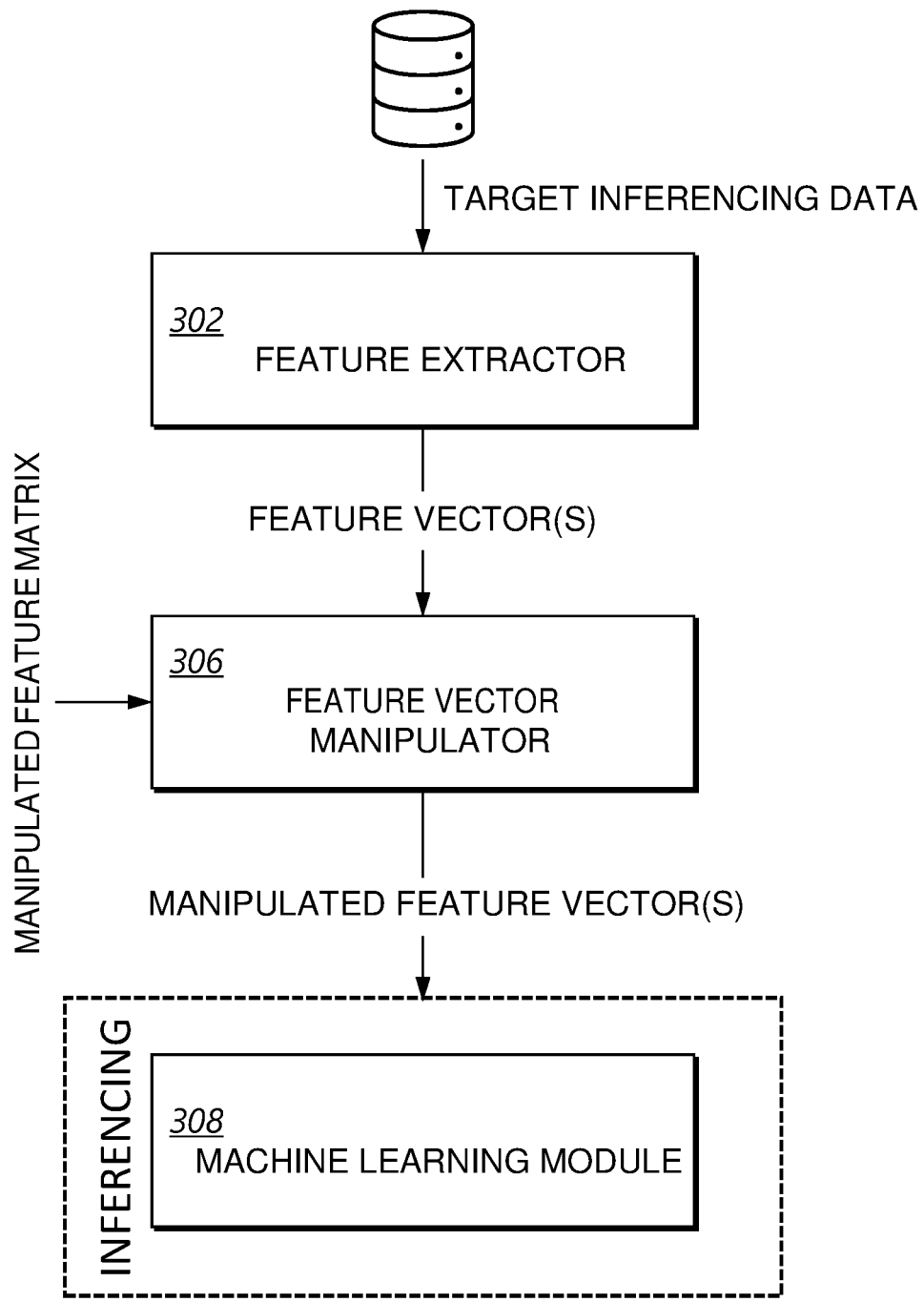
FIG. 5 depicts an exemplary pipeline for inferencing a trained anomaly-detection machine learning model using an optimized target feature space generated by the present technique, in accordance with an embodiment of the present technique.

FIG. 5 depicts an exemplary pipeline for inferencing an anomaly-detection machine learning model using an optimized target feature space generated by the present technique, as may be realized by feature optimizer 300 shown in FIG. 1.

Steps of method 400 may either be performed in the order they are presented or in a different order (or even in parallel), as long as the order allows for a necessary input to a certain step to be obtained from an output of an earlier step. In addition, the steps of method 400 are performed automatically (e.g., by computer 101 of FIG. 1, and/or by any other applicable component of computing environment 100), unless specifically stated otherwise.

Method 400 begins in step 402, wherein feature optimizer 300 receives target data representing usage by an entity e of a database resource, e.g., within an enterprise. In an exemplary embodiment of method 200, the target data represents usage and behavior over time by entity e over a database resource within an enterprise. For example, such data may comprise information regarding usage and access by entity e of different database objects (i.e., any defined object in a database that is used to store or reference data, such as tables, views, sequences, and the like).

In step 404, the instructions of feature extractor 302 may cause feature optimizer 300 to perform a feature extraction stage with respect to the target data received in step 402. In some embodiments, the feature extraction stage comprises transforming the raw data into a numerical representation that can be directly processed by a computing system, such as computer 101 in FIG. 1, while preserving the information represented in the original data set.

Accordingly, in some embodiments, feature extractor 302 may generate, with respect to entity e, a feature vector V, which is an n-dimensional vector of numerical features that represents the usage by entity e of database resource objects during a specified period of time. In some embodiments, the generated feature vector V may be sent for further processing to one or more other modules of feature optimizer 300, such as feature matrix generator 304 and/or feature vector manipulator 306.

In step 406, the instructions of feature vector manipulator 306 may cause feature optimizer 300 to obtain a manipulated feature matrix U', as generated according to steps 206-210 of method 200 detailed above. The obtained manipulated feature matrix U' represents the usage by each entity within an enterprise, of the various database objects over time. Thus, for each entity e, matrix U' comprises an entity-object usage vector in V.

In step 408, feature vector manipulator 306 generates a manipulated feature vector V', based on the feature vectors V generated in step 404, and the manipulated feature matrix U' obtained in step 406. The process of generating manipulated feature vector V' detailed with reference to step 212 of method 200.

At the conclusion of step 408, feature vector manipulator 306 obtains a manipulated feature vector V', based on the input feature vector V generated in step 404, and the manipulated feature matrix U' obtained in step 406.

In step 410, machine learning module 308 inferences a trained anomaly detection model (as may be trained with reference to the various steps of method 200 described herein above), over the manipulated feature vector V', to detect anomalous usage behavior by entity e over the enterprise database resource.

EXPERIMENTAL RESULTS

The present inventors conducted an experiment to evaluate the effectiveness of the present technique for optimizing the generation of feature spaces used for training and inferencing anomaly-detection machine learning models.

The inventors obtained a set of training data representing usage by 100 entities of resources within an enterprise over a period of 14 days each.

At a first stage of the experiments, a separate anomaly detection model was trained for each of the entities, using features generated from the training data, using common feature extraction methods. The separate trained anomaly detection models were then inferenced over target usage data gathered over a period of 14 days with respect to each entity. The inferencing was conducted using features generated from the target data using common feature extraction methods.

At a second stage of the experiments, the separate anomaly detection models were then trained for each of the entities, At a first stage of the experiments using features generated from the training data according to the present techniques, as detailed in the various steps of method 200 detailed hereinabove. The separate trained anomaly detection models were then inferenced over the target usage data, using features generated from the target data according to the present techniques, as detailed in the various steps of method 400 detailed hereinabove.

Figure 6A:
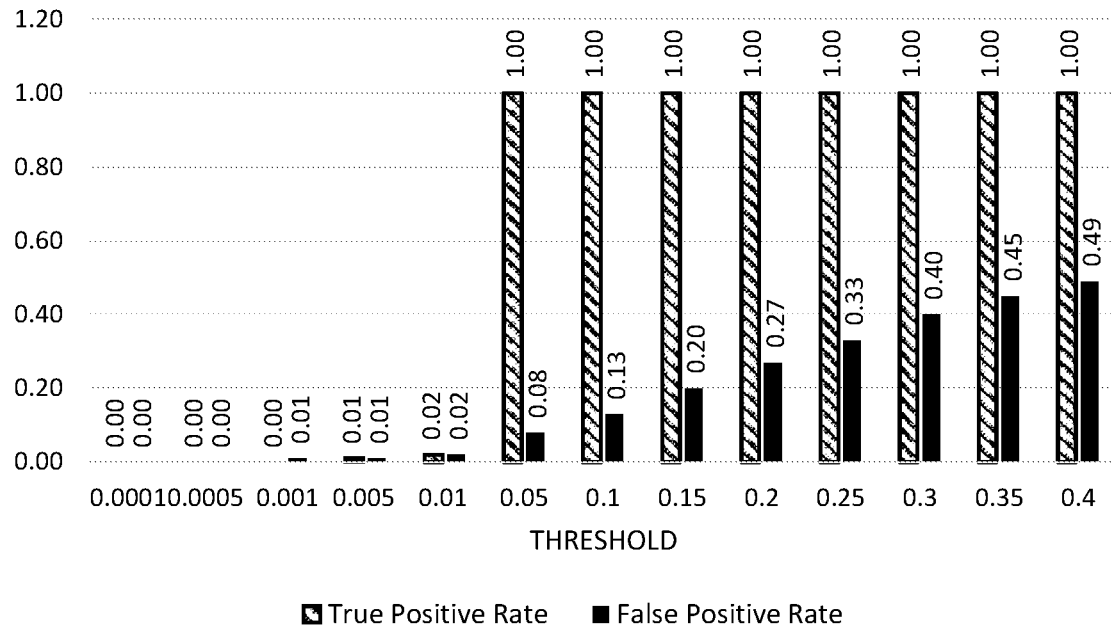
FIGS. 6A-6B and 7A-7B show graphs of experimental results.
Figure 6A:
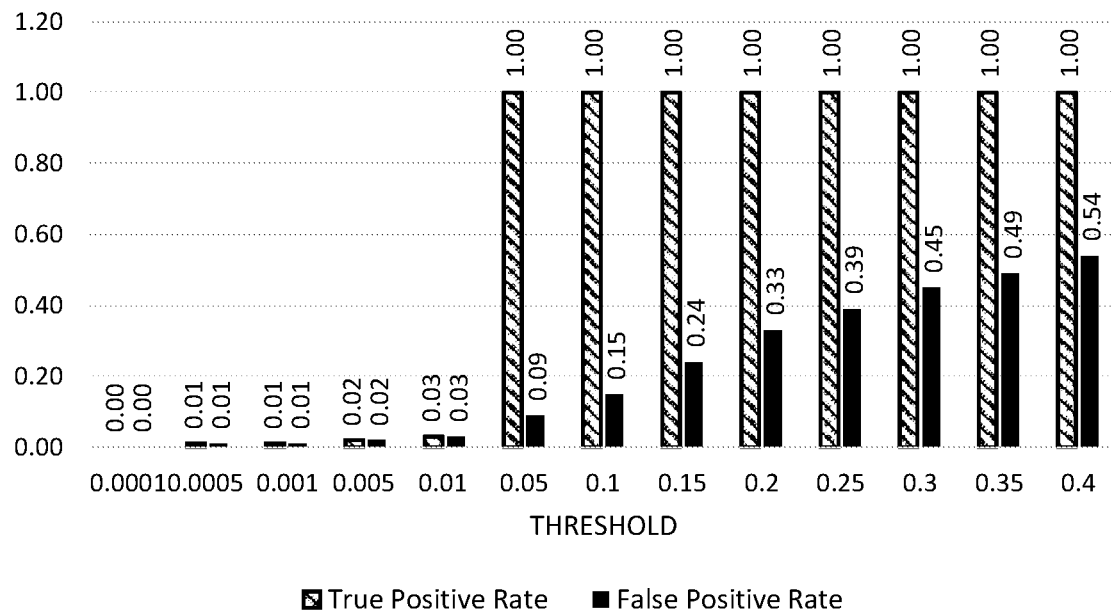
Figure 6B:
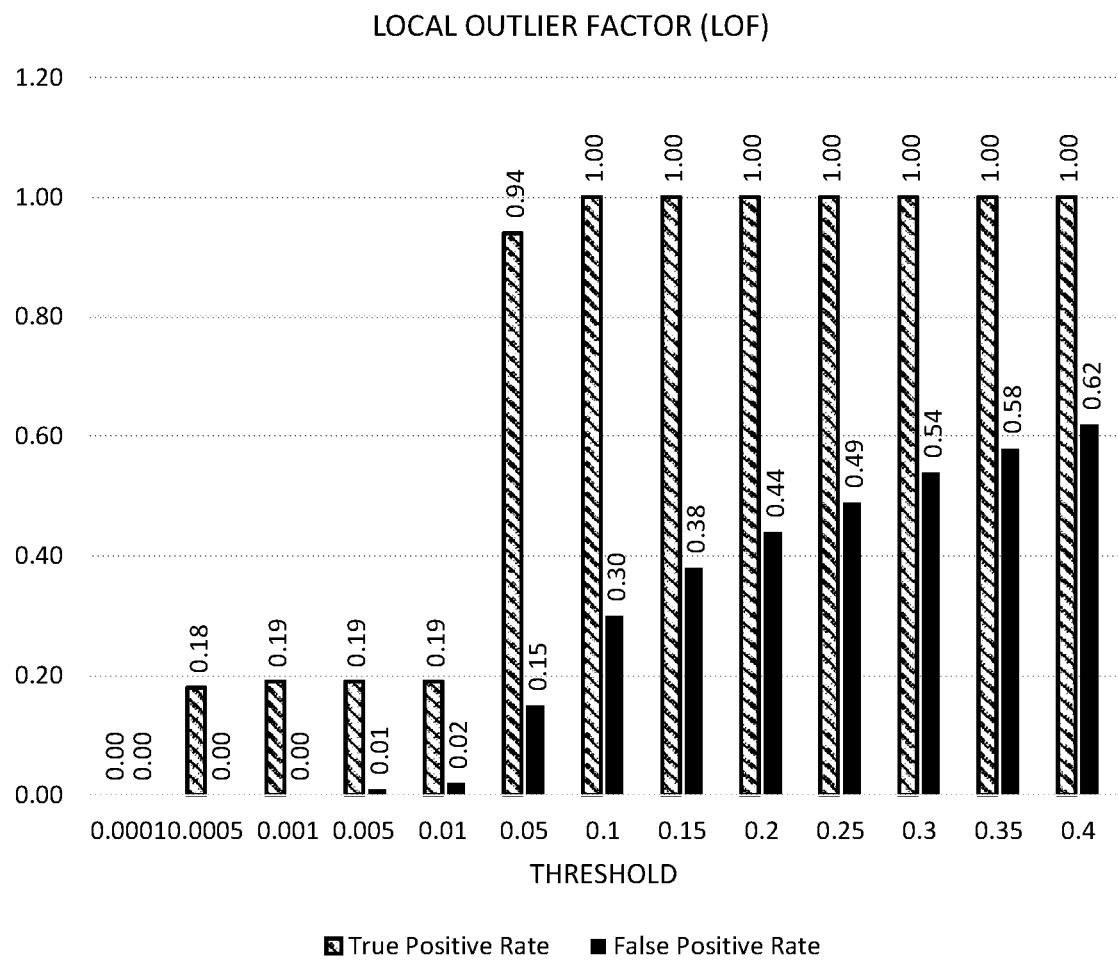

FIGS. 6A-6B depict inferencing results for the first stage of the experiments (i.e., using features extracted according to common feature extraction methods). Shown are the average true positive rate (TPR) and false positive rate (FPR), using various threshold values. The results are shown for three common anomaly detection algorithms: cluster-based local outlier factor (CBLOF), shown in the top half of FIG. 6A, k nearest neighbor (KNN), shown in the bottom half of FIG. 6A, and local outlier factor (LOF), shown in FIG. 6B.

Figure 7A:
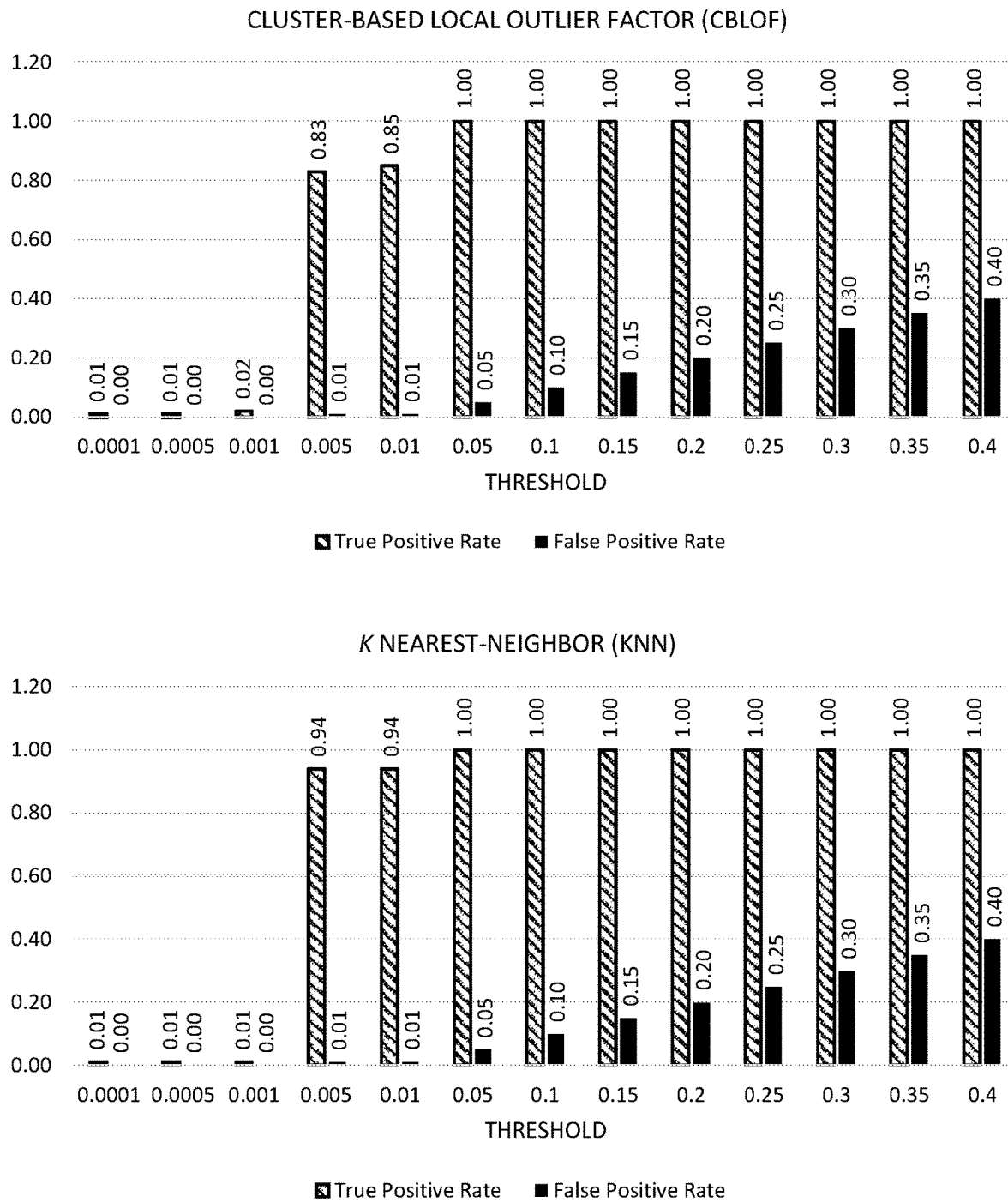
Figure 7B:
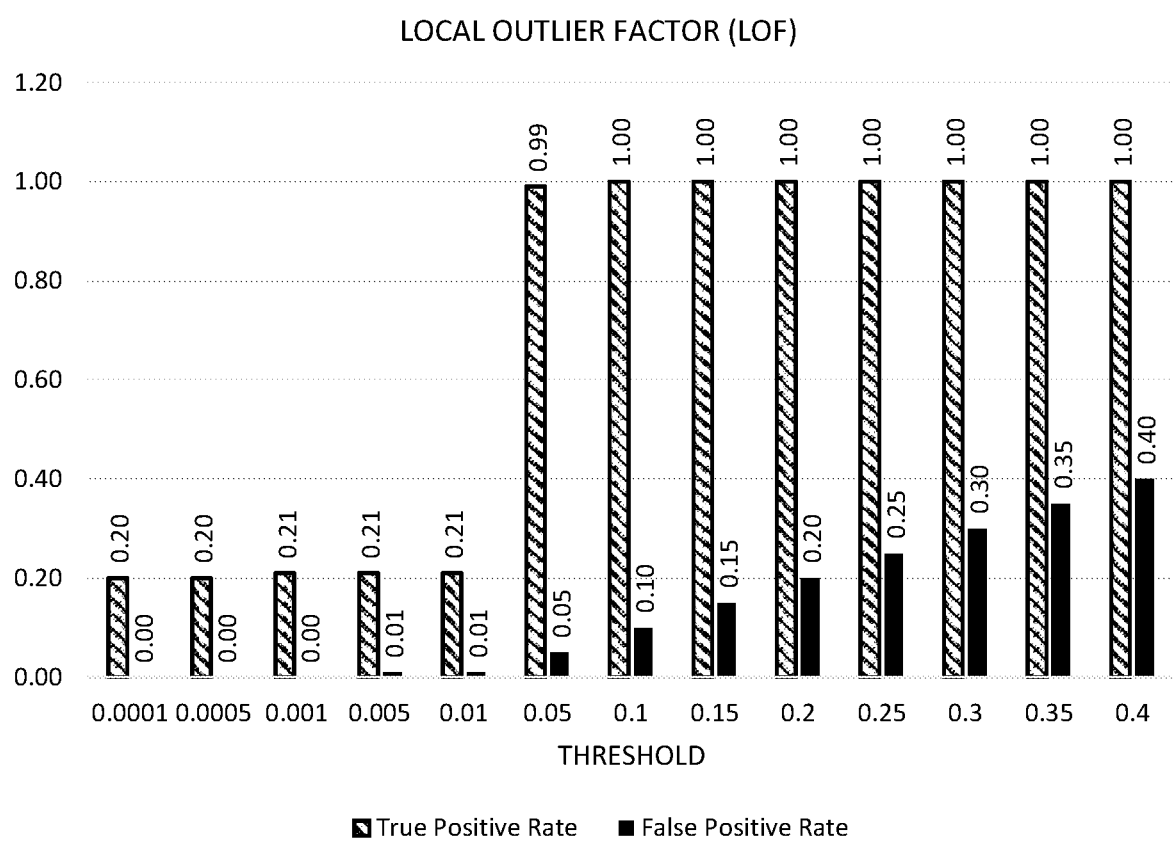

FIGS. 7A-7B depict inferencing results for the second stage of the experiments (i.e., using features extracted according to the present optimization technique). Shown are the average TPR and FPR using various threshold values. The results are shown for three common anomaly detection algorithms: cluster-based local outlier factor (CBLOF), shown in the top half of FIG. 7A, k nearest neighbor (KNN), shown in the bottom half of FIG. 7A, and local outlier factor (LOF), shown in FIG. 7B.

As can be seen, after applying the present optimization technique, inferencing results reflect similar or higher TPR with much lower FPR, over various classifier thresholds. For example, with an LOF classifier (results shown in FIGS. 6B and 7B, respectively), using a threshold of 0.05, TPR improved from 0.94 to 0.99 from the first stage to the second stage of the experiment, while was FPR was reduced from 0.15 to 0.05.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range-10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:
receiving a set of data representing usage by entities of objects in a computing resource;
extracting, from said received initial set of data, one or more feature vectors, each representing said usage by a particular one of said entities with respect to said objects;
generating, from said one or more feature vectors, a feature matrix;
with respect to each entry in said feature matrix, wherein said entry comprises a usage value associated with one of said entities and one of said objects:

(i) assigning a binary value to said entry, based on a predefined usage threshold, (ii) identifying, among said one or more entities, k nearest neighbor entities with respect to said one of said entities, based on a predefined distance threshold, and (iii) modifying said usage value of said entry, based on usage values associated with each of said k nearest neighbor entities with respect to said one of said objects; and updating said feature matrix with said modified usage values, to obtain a manipulated feature matrix.

2. The computer-implemented method of claim 1, further comprising manipulating said one or more feature vectors based on said manipulated feature matrix, to obtain one or more manipulated feature vectors.

3. The computer-implemented method of claim 2, further comprising constructing a training dataset from all of said manipulated feature vectors, wherein said constructed training dataset is used to train an anomaly detection machine learning model.

4. The computer-implemented method of claim 3, further comprising inferencing said trained anomaly detection machine learning model over a target manipulated feature vector representing usage by any one of said entities with respect to said computer resource, to detect anomalous behavior by said one of said entities.

5. The computer-implemented method of claim 1, wherein said manipulating comprises, with respect to each feature in a feature vector that has a value equal to zero, modifying said feature based on (i) a predefined maximum distance parameter, multiplied by (ii) a number of said k nearest neighbor entities for which a corresponding value is equal to 1.

6. The computer-implemented method of claim 1, wherein said modifying is further based on a distance between said one of said entities and each of said k nearest neighbors entities.

7. The computer-implemented method of claim 1, wherein said modifying is further based on a similarity score associated with each of said k nearest neighbor entities, wherein said similarity score is based on: the number k, the usage value associated with each of said k nearest neighbors, the distance between said one of said entities and each of said k nearest neighbors, and a predefined similarity factor.

8. A system comprising:

at least one hardware processor; and a non-transitory computer-readable storage medium having stored thereon program instructions, the program instructions executable by the at least one hardware processor to:

receive a set of data representing usage by entities of objects in a computing resource, extract, from said received initial set of data, one or more feature vectors, each representing said usage by a particular one of said entities with respect to said objects, generate, from said one or more feature vectors, a feature matrix, with respect to each entry in said feature matrix, wherein said entry comprises a usage value associated with one of said entities and one of said objects:

(i) assign a binary value to said entry, based on a predefined usage threshold, (ii) identify, among said one or more entities, k nearest neighbor entities with respect to said one of said entities, based on a predefined distance threshold, and (iii) modify said usage value of said entry, based on usage values associated with each of said k nearest neighbor entities with respect to said one of said objects, and update said feature matrix with said modified usage values, to obtain a manipulated feature matrix.

9. The system of claim 8, wherein said program instructions are further executable to manipulate said one or more feature vectors based on said manipulated feature matrix, to obtain one or more manipulated feature vectors.

10. The system of claim 9, wherein said program instructions are further executable to construct a training dataset from all of said manipulated feature vectors, wherein said constructed training dataset is used to train an anomaly detection machine learning model.

11. The system of claim 10, wherein said program instructions are further executable to inference said trained anomaly detection machine learning model over a target manipulated feature vector representing usage by any one of said entities with respect to said computer resource, to detect anomalous behavior by said one of said entities.

12. The system of claim 8, wherein said manipulating comprises, with respect to each feature in a feature vector that has a value equal to zero, modifying said feature based on (i) a predefined maximum distance parameter, multiplied by (ii) a number of said k nearest neighbor entities for which a corresponding value is equal to 1.

13. The system of claim 8, wherein said modifying is further based on a distance between said one of said entities and each of said k nearest neighbors entities.

14. The system of claim 8, wherein said modifying is further based on a similarity score associated with each of said k nearest neighbor entities, wherein said similarity score is based on: the number k, the usage value associated with each of said k nearest neighbors, the distance between said one of said entities and each of said k nearest neighbors, and a predefined similarity factor.

15. A computer program product comprising a non-transitory computer-readable storage medium having program instructions embodied therewith, the program instructions executable by at least one hardware processor to:

receive a set of data representing usage by entities of objects in a computing resource;

extract, from said received initial set of data, one or more feature vectors, each representing said usage by a particular one of said entities with respect to said objects;

generate, from said one or more feature vectors, a feature matrix;

with respect to each entry in said feature matrix, wherein said entry comprises a usage value associated with one of said entities and one of said objects:

(i) assign a binary value to said entry, based on a predefined usage threshold, (ii) identify, among said one or more entities, k nearest neighbor entities with respect to said one of said entities, based on a predefined distance threshold, and (iii) modify said usage value of said entry, based on usage values associated with each of said k nearest neighbor entities with respect to said one of said objects; and update said feature matrix with said modified usage values, to obtain a manipulated feature matrix.

16. The computer program product of claim 15, wherein said program instructions are further executable to manipulate said one or more feature vectors based on said manipulated feature matrix, to obtain one or more manipulated feature vectors.

17. The computer program product of claim 16, wherein said program instructions are further executable to construct a training dataset from all of said manipulated feature vectors, wherein said constructed training dataset is used to train an anomaly detection machine learning model.

18. The computer program product of claim 17, wherein said program instructions are further executable to inference said trained anomaly detection machine learning model over a target manipulated feature vector representing usage by any one of said entities with respect to said computer resource, to detect anomalous behavior by said one of said entities.

19. The computer program product of claim 15, wherein said manipulating comprises, with respect to each feature in a feature vector that has a value equal to zero, modifying said feature based on (i) a predefined maximum distance parameter, multiplied by (ii) a number of said k nearest neighbor entities for which a corresponding value is equal to 1.

20. The computer program product of claim 15, wherein said modifying is further based on (i) a distance between said one of said entities and each of said k nearest neighbors entities, and (ii) a similarity score associated with each of said k nearest neighbor entities, wherein said similarity score is based on: the number k, the usage value associated with each of said k nearest neighbors, the distance between said one of said entities and each of said k nearest neighbors, and a predefined similarity factor.

\* \* \* \* \*